(12) United States Patent
Hwang et al.

(10) Patent No.: US 6,486,935 B1
(45) Date of Patent: Nov. 26, 2002

(54) LIQUID CRYSTAL DISPLAY DEVICE HAVING IMPROVED APERTURE RATIO

(75) Inventors: Jeung Tae Hwang, Kyoungki-do (KR); Jeong Ha Lee, Kyoungki-do (KR); Tae Kyun Jeong, Kyoungki-do (KR); Su Woong Kang, Kyoungki-do (KR); Young Hoon Kim, Kyoungki-do (KR); Sang Jin Kim, Kyoungki-do (KR); Jae Geon You, Kyoungki-do (KR); Doo Hee Lee, Kyoungki-do (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 0 days.

(21) Appl. No.: 09/344,020

(22) Filed: Jun. 25, 1999

(30) Foreign Application Priority Data

Jun. 27, 1998 (KR) ............................................. 98 24545

(51) Int. Cl.⁷ ........................ G02F 1/1343; G02F 1/136
(52) U.S. Cl. ........................ 349/147; 349/145; 349/42; 257/72
(58) Field of Search ..................... 349/42, 43, 143–147; 257/59, 72

(56) References Cited

U.S. PATENT DOCUMENTS

| | | | |
|---|---|---|---|
| 4,955,697 A | 9/1990 | Tsukada et al. | 350/332 |
| 5,457,553 A | 10/1995 | Mori | 359/59 |
| 5,535,028 A * | 7/1996 | Bae et al. | 349/145 |
| 5,574,582 A * | 11/1996 | Takeda et al. | 349/42 |
| 5,760,854 A | 6/1998 | Ono et al. | 349/38 |
| 5,818,412 A | 10/1998 | Maekawa | 345/100 |
| 5,966,189 A * | 10/1999 | Matsuo | 349/38 |
| 6,236,383 B1 * | 5/2001 | Nakajima et al. | 345/90 |

FOREIGN PATENT DOCUMENTS

JP        5-257162        10/1993

* cited by examiner

Primary Examiner—William L. Sikes
Assistant Examiner—Dung Nguyen
(74) Attorney, Agent, or Firm—Ladas & Parry

(57) ABSTRACT

A liquid crystal display device which can improve aperture ratio by minimizing light blocking is disclosed. In a liquid crystal display device according to the present invention, gate lines and data lines are arranged to be overlapped with each other, thereby increasing light transmittance region. Furthermore, TFT is disposed between the gate line and data line, thereby further increasing light transmittance region. As a result, aperture ratio is improved.

18 Claims, 6 Drawing Sheets

LIQUID CRYSTAL DISPLAY DEVICE HAVING IMPROVED APERTURE RATIO

BACKGROUND OF THE INVENTION

1. Field of the Invention

The present invention relates to a liquid crystal display device, and more particularly to a liquid crystal display device having a improved aperture ratio.

2. Description of the Related Art

In general, an active matrix type-liquid crystal display (AM-LCD) devices is thin, so that it is often used in various display devices. In this AM-LCD device, one TFT is provided as a switching element for each pixel, so that individual pixel electrodes are independently driven. The contrast is therefore not reduced based upon the reduction of a duty ratio, and also the angle of visibility is not reduced, even when the capacity of display is increased to increase the number of lines.

FIG. 1 shows a plan view of a prior AM-LCD.

Referring to FIG. 1, gate lines 11-1 and 11-1 and data lines 13-1 and 13-2 are arranged in a matrix on a transparent insulating layer 10 such as a glass. The gate line 11-1 and 11-2 are arranged in parallel in the direction of x axis. The data lines 13-1 and 13-2 are arranged in parallel in the direction of a y axis which is substantially perpendicular to the x axis, thereby defining pixel regions 100. Preferably, the length of the y axis direction of the pixel region 100 is longer than that of the x axis direction. Each the line width GW of the gate lines 11-1 and 11-2 is 10 to 12 μm and each the line width DW of the data lines 13-1 and 13-2 is 7 to 9 μm. TFTs are disposed respectively at the cross portions of the gate line 11-1 and 11-2 and the data lines 13-1 and 13-2. In FIG. 1, one TFT 20 in only showed the cross portion of the gate line 11-1 and data line 13-1. The TPT 20 includes a gate 11a projected from the gate line 11-1, a drain 13a projected from the data line 13-1 and overlapped with the portion of the gate 11a, and a source 13b separated from the drain 13a and overlapped with the portion of the gate 11a. A pixel electrodes 15 are disposed at the pixel regions 100 except for the TFT 20 to be separated from the gate lines 11-1 and 11-2 and the data lines 13-1 and 13-2, with selected distance and to be in contact with the source 13b.

In the prior AM-LCD above described, the gate lines 11-1 and 11-2 are formed of an opaque material such as Al and Cr while the pixel electrode 15 are formed of a transparent material such an ITO (Indium Tin Oxide). An result, the gate lines 11-1 and 11-2 and the data lions 13-1 and 13-2 block off light, thereby reducing aperture ratio.

SUMMARY OF THE INVENTION

It is therefore an object of the present invention to a liquid crystal display device which can improve aperture ratio by minimizing light blocking.

To accomplish this above object, a liquid crystal display device according to a first embodiment of the present invention includes: an insulating substrate; a plurality of gate lines formed on the substrate and arranged in parallel in a first direction; a gate insulating layer formed on the substrate where the plurality of gate lines are formed; a plurality of data lines formed on the gate insulating layer and arranged in parallel in the first direction, overlapping with the plurality of gate lines, respectively; a plurality of pixel regions, each first direction length of the pixel regions extending as the line width of the date line, each second direction length of the pixel region being defined by the distance between the gate linen, the second direction being substantially perpendicular to the first direction; a plurality of pixel electrodes disposed on the plurality of pixel regions, respectively; and a plurality of thin film transistors disposed at one side of the plurality of pixel regions, respectively.

Furthermore, a liquid crystal display device according to a second embodiment of the present invention includes: an insulating substrate; a plurality of gate lines formed on the substrate and arranged in parallel in a first direction; a gate insulating layer formed on the substrate where the plurality of gate lines are formed; a plurality of data lines formed on the gate insulating layer and arranged in parallel in the first direction, overlapping with the plurality of gate lines, respectively; a plurality of pixel regions, each first direction length of the pixel regions extending as the line width of the gate lines, each second direction length of the pixel region being defined by the distance between the data lines, the second direction being substantially perpendicular to the first direction; a plurality of pixel electrodes disposed at the plurality of pixel regions, respectively; and a plurality of thin film transistors disposed at one side of the plurality of pixel regions, respectively.

In the first and second embodiments, the thin film transistor includes: a gate protected from the gate line; a drain projected from the data line and overlapped with the gate; and a source separated from the drain and overlapped with the gate, the source being in contact with the pixel electrode. The gate and data lines are formed of an oblique metal layer, respectively and the pixel electrode is formed of a transparent metal layer such as an ITO.

Furthermore, a liquid crystal display device according to a third embodiment of the present invention includes: an insulating substrate; a plurality of gate lines formed on the substrate and arranged in parallel in a first direction; a plurality of data lines arranged in parallel in the first direction, overlapping with the plurality of gate lines, respectively; a plurality of pixel regions, each first direction length of the pixel regions extending an the line width of the data lines, each second direction length of the pixel regions being defined by the distance between the gate lines, the second direction being substantially perpendicular to the first direction; a plurality of pixel electrodes disposed on the plurality of pixel regions, respectively; a plurality of thin film transistors disposed between the plurality of gate lines and the plurality of data lines, respectively; and a gate insulating layer and an intermediate insulating layer interposed between the plurality of gate lines and the plurality of data lines, the intermediate insulating layer having a contact hole.

In the third embodiment, the thin film transistor includes: a gate is formed on the substrate; a channel layer formed on the gate insulating layer over the gate; a drain formed on the channel layer to be overlapped with one side of the gate; and a source formed on the channel layer to be overlapped with the other side of the gate and be in contact with the pixel electrode, wherein, the drain is connected to the data line through the contact hole. The intermediate insulating layer is formed of a material having develop type of PC335, PC403, series material thereof, or BCB (made in DWO company) of a dry etch type, as material having a relative low dielectric constant. The gate and data lines are formed of an oblique metal layer, respectively and the pixel electrode is formed of a transparent metal layer such as an ITO.

Additional object, advantages and novel features of the invention will be not forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Hereinafter, preferred embodiments of the present invention will be explained with reference to accompanying drawings.

Figure 2:
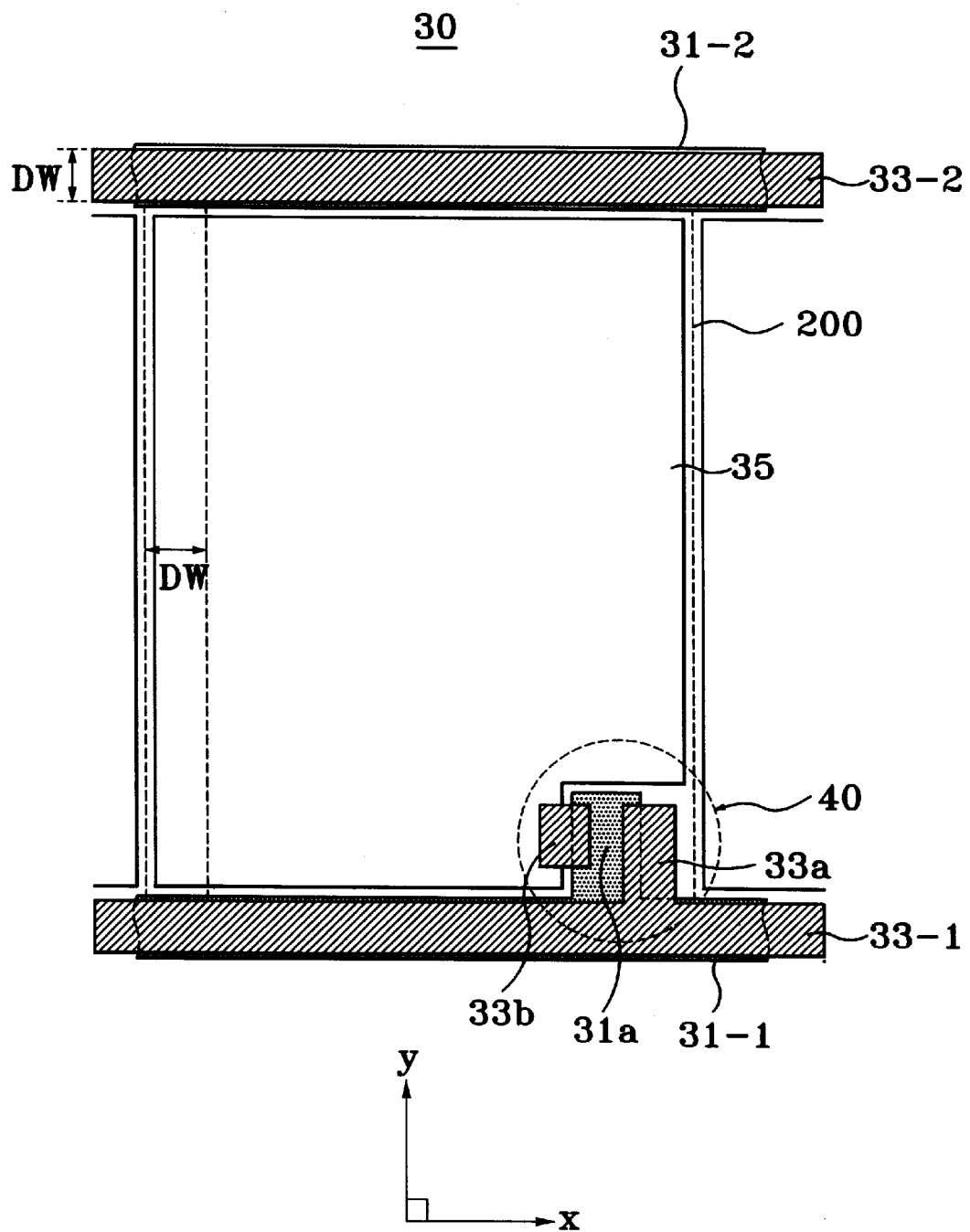
FIG. 2 shows a plan view of an AM-LCD according to a first embodiment of the present invention.

FIG. 2 shows a plan view of an AM-LCD according to a first embodiment of the present invention.

Figure 1:
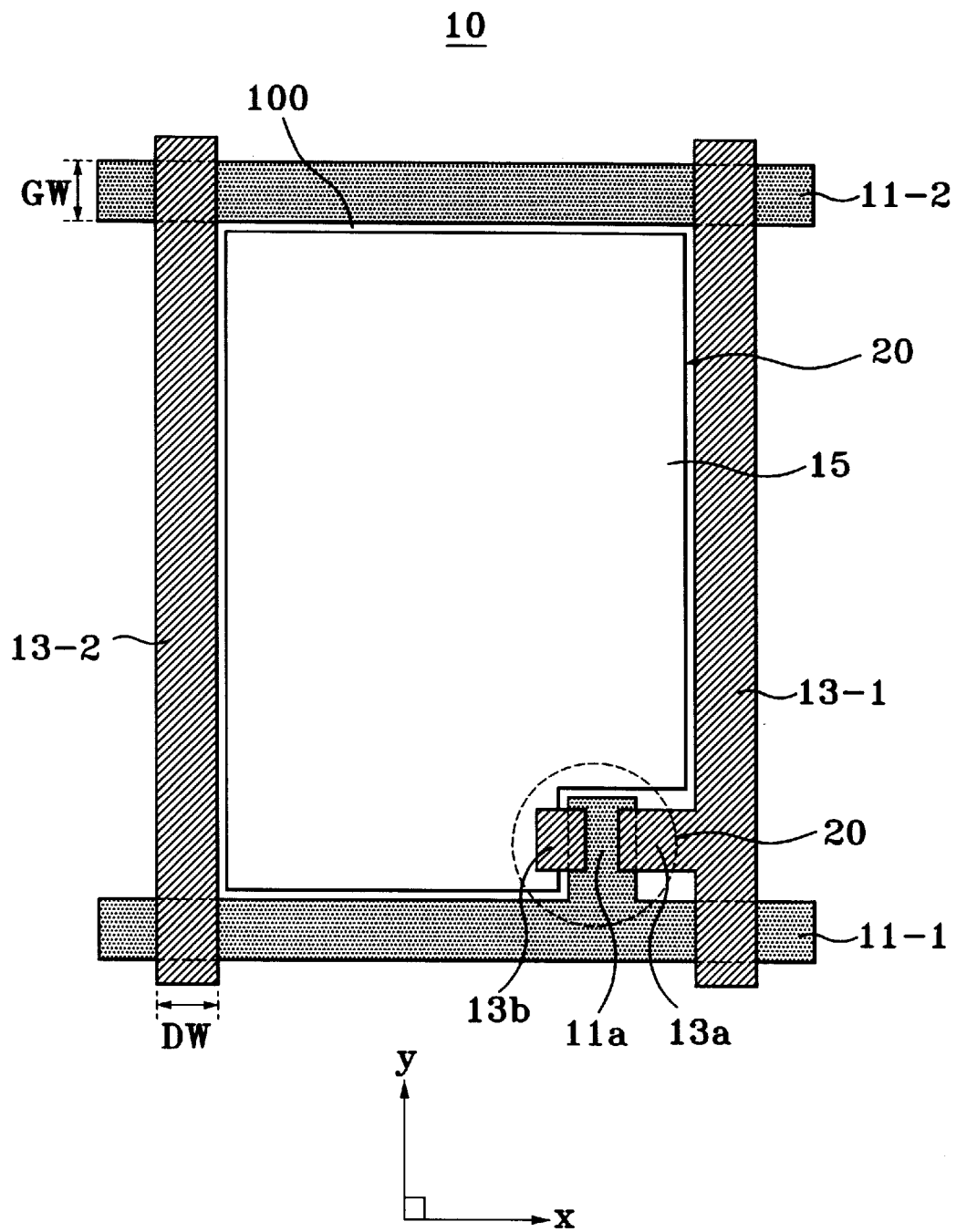
FIG. 1 shows a plan view of a prior AM-LCD.

Referring to FIG. 2, gate lines 31-1 and 31-2 are formed on a transparent insulating substrate 30 such as a glass so that they are arranged in parallel in the direction of a x axis, to define a y axis direction length of a pixel region 200. Here, the x axis is perpendicular to the y axis. Preferably, the gate lines 31-1 and 31-2 are formed of an oblique metal layer such as Al and Cr and each line width of them is 10 to 12 $\mu$m. A gate insulating layer (not shown) is formed on the substrate where the gate lines 31-1 and 31-2 are formed. Data lines 33-1 and 33-2 are formed on the gate insulating layer so that they are arranged in parallel in the direction of x axis, overlapping with the gate lines 31-1 and 31-2. Therefore, as show in FIG. 2, the x axis direction length of the pixel region 200 is extended as the line width DW of the data lines 33-1 differently from the prior pixel region (100 shown in FIG. 1). Preferably, the length of the y axis direction of the pixel region 200 is longer than that of the x axis direction. The data line 33-1 and 33-2 are formed of an oblique metal layer such as Al and Cr and each the line width DW of them 7 to 9 $\mu$m.

A TFT 40 is disposed at the pixel region 200. The TFT 40 includes a gate 31a projected from the gate line 31-1, a drain 33a projected from the data line 33-1 and overlapped with the portion of the gate 31a, and a source 33b separated from the drain 33a and overlapped with the portion of the gate 31a. A pixel electrode 35 is disposed at the pixel region 200 except for the TFT. The pixel electrode 35 is separated from the gate lines 31-1 and 31-2 and in contact with the source 35b. Preferably, the pixel electrode 35 in formed of a transparent metal layer such an ITO.

According to the first embodiment, the data lines 33-1 and 33-2 are arranged to be overlapped with the gate lines 31-1 and 31-2, 80 that the x axis direction length of the pixel region 200 is extended as the line width of the data line. For example, in case the unit pixel region of the prior VAG panel is 240×80 $\mu$m, the unit pixel region of the first embodiment is 240×88 $\mu$m. As a result, light transmission region increases, thereby improving aperture ratio.

Figure 3:
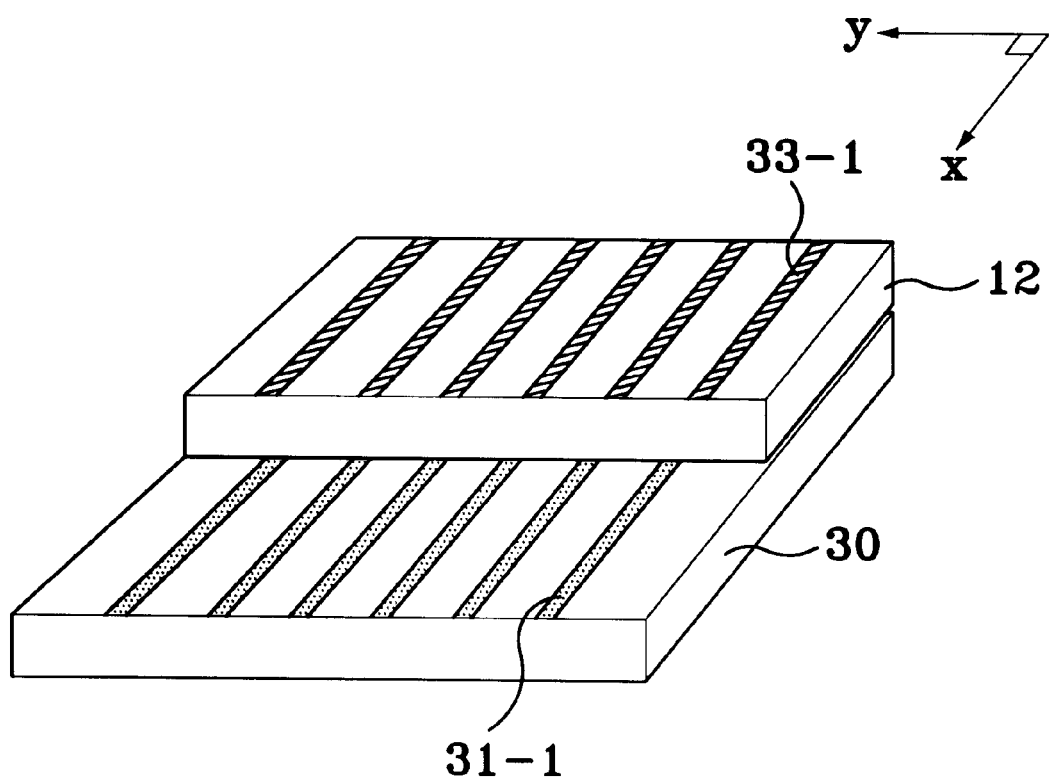
FIG. 3 shows a pad region of the AM-LCD according to the first embodiment of the present invention.

FIG. 3 shows a pad region of the above AM-LCD. As shown in FIG. 3, the gate line 31-1 and the date line 33-1 are arranged to be overlapped with each other in the direction of the x axis and the gate insulating layer 12 is interposed therebetween.

Figure 4:
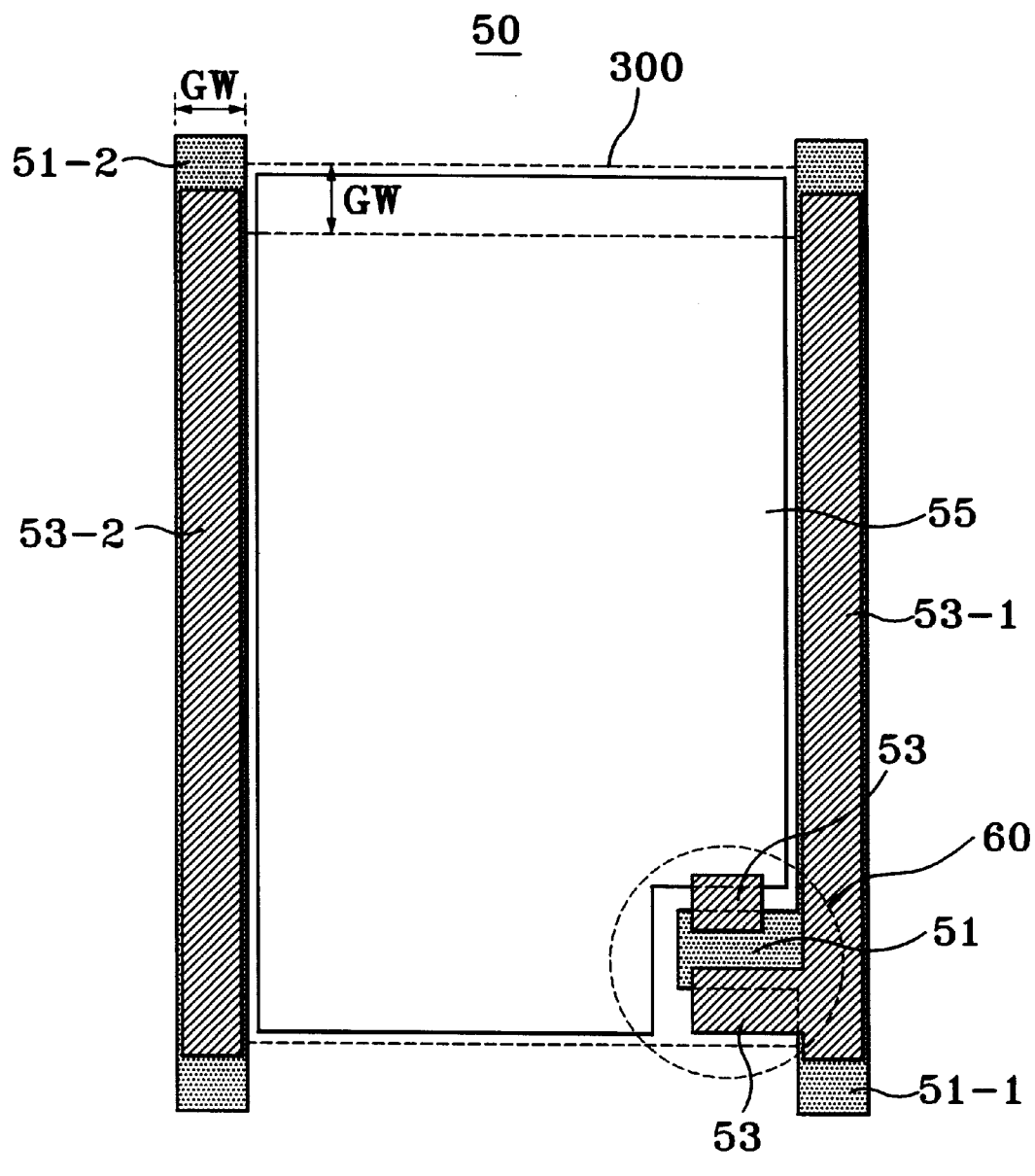
FIG. 4 shows a plan view of an AM-LCD according to a second embodiment of the present invention.

FIG. 4 shows a plan view of an AM-LCD according to a second embodiment of the present invention.

Referring to FIG. 4, gate lines 51-1 and 51-2 are formed on a transparent insulating substrate 50 such as a glass so that they are arranged in parallel in the direction of a y axis, to define a x axis direction length of a pixel region 300. Here, the y axis is perpendicular to the x axis. Preferably, the gate lines 51-1 and 51-2 are formed of an oblique metal layer such as Al and Cr and each line width of them is 10 to 12 $\mu$m. A gate insulating layer (not shown) in formed on the substrate where the gate lines 51-1 and 51-2 are formed. Data lines 53-1 and 53-2 are formed on the gate insulating layer so that they are arranged in parallel in the direction of y axis, overlapping with the gate lines 51-1 and 51-2. Therefore, the y axis direction length of the pixel region 300 is extended as the line width GW of the gate lines 15 31-1 differently from the prior pixel region 100 (refer to FIG. 1). Preferably, the length of the y axis direction of the pixel region 300 in longer than that of the x axis direction. The data line 53-1 and 53-2 are formed of an oblique metal layer such as Al and Cr and each the line width DW of them 7 to 9 $\mu$m.

A TFT 60 is disposed at the pixel region 300. The TFT 60 includes a gate 51a projected from the gate line 51-1, a drain 53a projected from the data line 53-1 and overlapped with the portion of the gate 51a, and a source 53b separated from the drain 53a and overlapped with the portion of the gate 51a. A pixel electrode 55 is disposed at the pixel region 300 except for the TFT. The pixel electrode 55 is separated from the gate lines 51-1 and 51-2 and in contact with the source 55b. Preferably, the pixel electrode 55 is formed of a transparent metal layer such as an ITO.

According to the second embodiment, the data lines 53-1 and 53-2 are arranged to be overlapped with the gate lines 51-1 and 51-2, 80 that the x axis direction length of the pixel region 300 is extended as the line width of the data line. For example, in case the unit pixel region of the prior VAG panel is 240×80 $\mu$m, the unit pixel region of the second embodiment is 250×80 $\mu$m. As a result, light transmission region increases, thereby improving aperture ratio.

As not shown in the drawings, the gate line 51-1 the data line 53-1 are arranged to be overlapped with each other in the direction of the y axis and the gate insulating layer is interposed therebetween.

Furthermore, it in possible to further improve aperture ratio more by disposing a TFT between a gate line and a data line.

Figure 5:
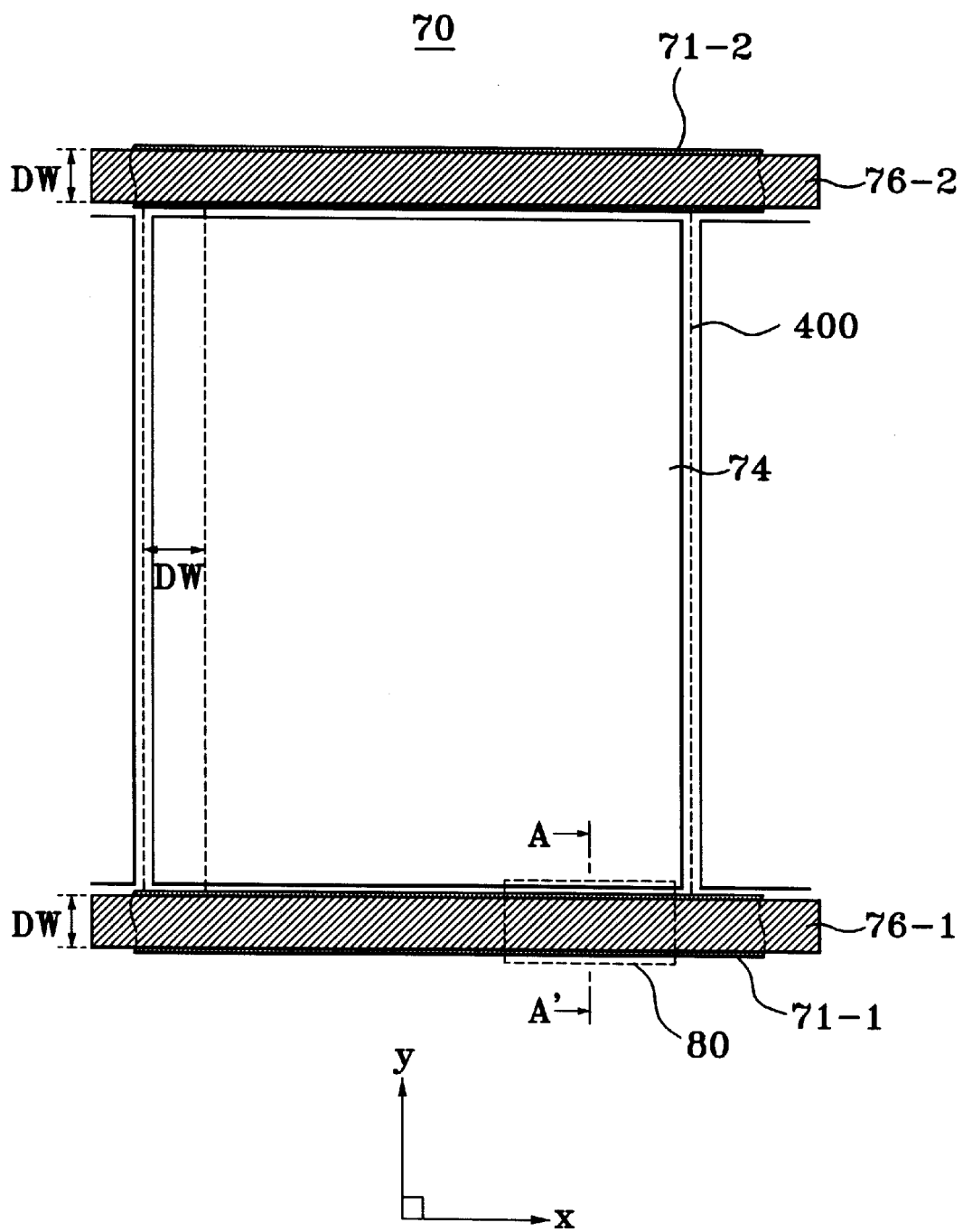
FIG. 5 shows a plan of an AM-LCD according to a third embodiment of the present invention.

FIG. 5 shows a plan view of an AM-LCD according to a third embodiment of the prevent invention.

Referring to FIG. 5, gate lines 71-1 and 71-2 are formed on a transparent insulating substrate 70 ouch as a glass so that they are arranged in parallel in the direction of a x axis, to define a y axis direction length of a pixel region 400. The x axis is perpendicular to the y axis. Preferably, the gate lines 71-1 and 71-2 are formed of an oblique metal layer such as Al and Cr and each line width of them is 10 to 12 $\mu$m. Data lines 76-1 and 76-2 are arranged in parallel in the direction of x axis, overlapping with the gate lines 71-1 and 71-2. Therefore, the x axis direction length of the pixel region 400 is extended as the line width DW of the data lines 76-1 and 76-2 differently from the prior pixel region 100 (refer to FIG. 1). Preferably, the length of the y axis direction of the pixel region 400 is longer than that of the x axis direction. The data line 76-1 and 76-2 are formed of an oblique metal layer such an Al and Cr and each the line width DW of them 7 to 9 μm. The pixel electrode 74 is disposed at the pixel region 400. Preferably, the pixel electrode 74 is formed of a transparent metal layer such as an ITO. furthermore, a gate insulating layer (72; refer to FIG. 6) and an intermediate insulating layer (75; refer to FIG. 6) are interposed between the gate lines 71-1 and 71-2 and the data lines 76-1 and 76-2 The intermediate insulating layer has a contact hole (not shown).

In the third embodiment, a TFT 80 is disposed between the gate lines 71-1 and 71-2 and the data lines 76-1 and 76-2 adjacent to one side of the pixel region 400.

Figure 6:
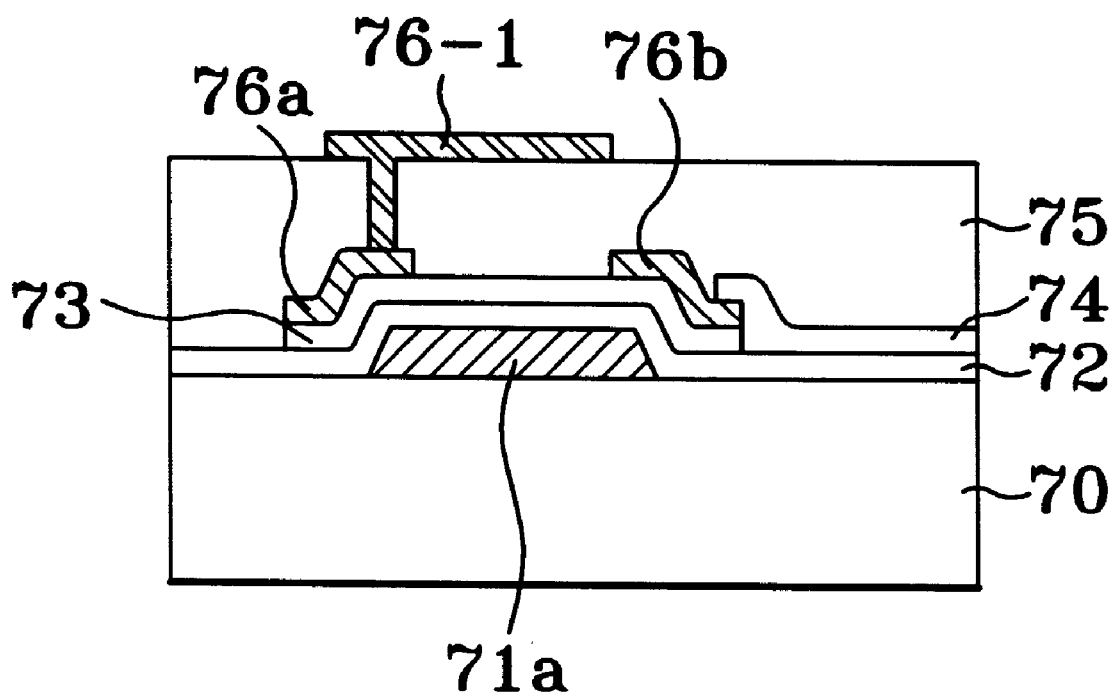
FIG. 6 shows a cross sectional view taken away along the line A–A' line of FIG. 5.

FIG. 6 is a cross sectional view taken away along the line A-A' in FIG. 5. As shown in FIG. 6, a gate 71a if formed on the substrate 70 and an gate insulating layer 72 is formed on the overall substrate. A channel layer 73 is formed on the gate insulating layer 72 over the gate 71a. Source and drain 76a and 76b are formed on the channel layer 73 to be overlapped with both side of the gate 71a, respectively. Furthermore, a pixel electrode 75 is in contact with the source 76b. An intermediate insulating later 75 having a contact hole to expose the portion of the drain 76a is formed on the overall substrate. The data line 76-1 is formed on the intermediate insulating layer 75 to be overlapped with the gate 71a and is connected to the drain 76a through the contact hole.

For preventing parasitic capacitance, the intermediate insulating layer 75 is formed of material having a relative low dielectric constant and has the thickness of 2.5 to 3.5 μm. Preferably, the intermediate insulating layer 75 is formed of a material having develop type of PC335, PC403, series material thereof, or BCB (made in DWO company) of a dry etch type.

According to the third embodiment, the data lines 76-1 and 76-2 are arranged to be overlapped with the gate lines 71-1 and 71-2, thereby preventing light blocking due to the data lines 76-1. Furthermore, the TFT 80 is disposed between the gate lines 71-1 and 71-2, thereby preventing light blocking due to the TFT. An a result, light transmission region increases, thereby improving aperture ratio.

Furthermore, the gate lines and the data lines may be arranged to be overlapped with each other in the direction of the y axis and the TFT is interposed therebetween, are not shown in the drawings.

According to the,present invention above described, gate lines and data lines are arranged to be overlapped with each other, thereby increasing light transmittance region. Furthermore, TFT is disposed between the gate line and data line, thereby further increasing light transmittance region. As a result, aperture ratio is improved.

Although the preferred embodiment of this invention has been disclosed for illustrative purpose, those skilled in the art will appreciate that various modification, additions and substitutions are possible, without from the scope and spirit of the invention as described in the accompanying claims.

What is claimed is:

1. A liquid crystal display device, comprising:
   an insulating substrate;
   a plurality of gate lines formed on the substrate and arranged in parcel in a first direction;
   a gate insulating layer formed on the substrate where the plurality of gate lines are formed;
   a plurality of data lines formed on the gate insulating layer and arranged in parallel in the first direction, overlapping with the plurality of gate lines, respectively;
   a plurality of pixel regions, each first direction length of the pixel regions extended to a length of the pixel region plus the line width of the data line, each second direction length of the pixel region being defined by the distance between the gate lines, the second direction being substantially perpendicular to the first direction;
   a plurality of pixel electrodes disposed on the plurality of pixel regions, respectively; and
   a plurality of thin film transistors disposed at one side of the plurality of pixel regions, respectively.

2. The liquid crystal display device according to claim 1, wherein the thin film transistor includes:
   a gate electrode projected from the gate line;
   a drain electrode projected from the data line and overlapped with the gate electrode; and
   a source electrode separated from the drain electrode and overlapped with the gate electrode, the source electrode being in contact with the pixel electrode.

3. The liquid crystal display device according to claim 1, wherein the gate and data lines are formed of an oblique metal layer, respectively.

4. The liquid crystal display device according to claim 1, wherein the pixel electrode is formed of a transparent metal layer such as an ITO.

5. A liquid crystal display device, comprising:
   an insulating substrate;
   a plurality of gate lines formed on the substrate and arranged in parallel in a first direction;
   a gate insulating layer formed on the substrate where the plurality of gate lines are formed;
   a plurality of data lines formed on the gate insulating layer and arranged in parallel in the first direction, overlapping with the plurality of gate lines, respectively;
   a plurality of pixel regions, each first direction length of the pixel regions extended to a length of the pixel region plus the line width of the gate line, each second direction length of the pixel region being defined by the distance between the data lines, the second direction being substantially perpendicular to the first direction;
   a plurality of pixel electrodes disposed at the plurality of pixel regions, respectively; and
   a plurality of thin film transistors disposed at one side of the plurality of pixel regions, respectively.

6. The liquid crystal display device according to claim 5, wherein the thin film transistor includes:
   a gate electrode projected from the gate line;
   a drain electrode projected from the data line and overlapped with the gate electrode; and
   a source electrode separated from the drain electrode and overlapped with the gate electrode, the source electrode being in contact with the pixel electrode.

7. The liquid crystal display device according to claim 5, wherein the gate and data lines are formed of an oblique metal layer, respectively.

8. The liquid crystal display device according to claim 5, wherein the pixel electrode is formed of a transparent metal layer such as an ITO.

9. A liquid crystal display device, comprising:
   an insulating substrate;
   a plurality of gate lines formed on the substrate and arranged in parallel in a first direction;

a plurality of data lines arranged in parallel in the first direction, overlapping with the plurality of gate lines, respectively;

a plurality of pixel regions, each first direction length of the pixel regions extended to a length of the pixel region line with the width of the data lines, each second direction length of the pixel regions being defined by the distance between the gate lines, the second direction being substantially perpendicular to the first direction;

a plurality of pixel electrodes disposed on the plurality of pixel regions, respectively;

a plurality of thin film transistors disposed between the plurality of gate lines and the plurality of data lines, respectively; and a gate insulating layer and an intermediate insulate being interposed between the plurality of gate lines and the plurality of data lines, the intermediate insulating layer having a contact hole.

10. The liquid crystal display device according to claim 9, wherein the thin film transistor includes:

a gate electrode is formed on the substrate;

a channel layer formed on the gate insulating layer over the gate electrode;

a drain electrode formed on the channel layer to be overlapped with one side of the gate electrode; and a source electrode formed on the channel layer to be overlapped with the other side of the gate electrode and be in contact with the pixel electrode, wherein, the drain electrode is connected to the data line through the contact hole.

11. The liquid crystal display device according to claim 9, wherein the intermediate insulating layer in formed of a material having develop type of PC335, PC403, series material thereof, or BCB (made in DWO company) of a dry etch type, as material having a relative low dielectric constant.

12. The liquid crystal display device according to claim 9, wherein the gate and data lines are formed of an oblique metal layer, respectively.

13. The liquid crystal display device according to claim 11, wherein the pixel electrode is formed of a transparent metal layer such as an ITO.

14. A liquid crystal display device, comprising:

an insulating substrate;

a plurality of gate lines formed on the substrate and arranged in parallel to each other in a first direction;

a plurality of data lines arranged in parallel in the first direction, overlapping with the plurality of gate lines, respectively;

a plurality of pixel regions, each first direction length of the pixel regions extended to a length of the pixel region plus the line width of the gate lines, each second direction length of the pixel regions being defined by the distance between the data lines, the second direction being substantially perpendicular to the first direction;

a plurality of pixel electrodes disposed on the plurality of pixel regions, respectively;

a plurality of thin film transistors disposed between the plurality of gate lines and the plurality of data lines, respectively; and a gate insulating layer and an intermediate insulating layer interposed between the plurality of gate liens and the plurality of data lines, the intermediate insulating layer having a contact hole.

15. The liquid crystal display device according to claim 14, wherein the thin film transistor includes:

a gate electrode is formed on the substrate;

a channel layer formed on the gate insulating layer over the gate electrode;

a drain electrode formed on the channel layer to be overlapped with one side of the gate electrode; and a source electrode formed on the channel layer to be overlapped with the other side of the gate electrode and be in contact with the pixel electrode, wherein, the drain electrode is connected to the date line through the contact hole.

16. The liquid crystal display device according to claim 14, wherein the intermediate insulating layer is formed of a material having develop type of PC335, PC403, series material thereof, or BCB (made in DWO company) of a dry etch type, as material having a relative low dielectric constant.

17. The liquid crystal display device according to claim 14, wherein the gate and data lines are formed of an oblique metal layer, respectively.

18. The liquid crystal display device according to claim 14, wherein the pixel electrode is formed of a transparent metal layer such as an ITO.

* * * * *